United States Patent
Clavier

[11] 4,015,197
[45] Mar. 29, 1977

[54] METHOD AND APPARATUS FOR DETERMINING PERMEABLE ZONES IN SUBSURFACE EARTH FORMATIONS

[75] Inventor: Christian M. Clavier, Ridgefield, Conn.

[73] Assignee: Schlumberger Technology Corporation, New York, N.Y.

[22] Filed: June 24, 1975

[21] Appl. No.: 589,970

[52] U.S. Cl. .................................................. 324/10
[51] Int. Cl.² ......................................... G01V 3/18
[58] Field of Search ................................. 324/1, 10

[56] References Cited
UNITED STATES PATENTS

| | | |
|---|---|---|
| 3,075,142 | 1/1963 | Albright et al. ....................... 324/1 |
| 3,579,098 | 5/1971 | Mougne ............................... 324/10 |
| 3,760,260 | 9/1973 | Schuster .............................. 324/10 |

*Primary Examiner*—Gerard R. Strecker

[57] ABSTRACT

In accordance with an illustrative embodiment of the present invention, a method and apparatus for logging an earth formation of interest is disclosed that provides an indication of the presence of permeable and impermeable zones in the earth formation.

16 Claims, 3 Drawing Figures

METHOD AND APPARATUS FOR DETERMINING PERMEABLE ZONES IN SUBSURFACE EARTH FORMATIONS

BACKGROUND OF THE INVENTION

The present invention relates to methods and apparatus for investigating subsurface earth formations traversed by a borehole and, more particularly, to methods and apparatus for distinguishing between permeable and impermeable zones in the earth formation through the use of pad-mounted electrode systems traversing the borehole that determine the presence of mud cake.

When drilling a well, it is customary to use a drilling mud containing fine, solid particles in suspension. As the hydrostatic pressure of the mud column in the borehole is generally higher than the internal pressure of the earth formation, the fluid portion of the drilling mud has a tendency to penetrate into permeable layers or zones of the earth formation leaving a mud cake formed along the borehole wall. The fluid which penetrates into the permeable layers also drives out, at least partially, the fluid originally contained in the formation.

On the other hand, there is practically no mud cake on the borehole wall opposite impermeable subsurface earth formations since the mud fluid cannot penetrate into the impermeable formation. Knowledge of the presence or absence of mud cake, therefore, permits a differentiation to be made between permeable and impermeable layers in the formation. Since hydrocarbons are generally found in permeable layers in the formation, the presence or absence of a mud cake can provide an indication of the location of hydrocarbons below the surface of the earth.

One example of a well logging tool that has been developed to provide an indication of mud cake is the Microlog (a trademark of Schlumberger Limited) tool. That apparatus includes a pad-mounted electrode system, which is lowered into a borehole and from which one current is emitted into the formation and two voltages are measured at different distances from the center of the electrode structure. The two measurements provide an indication of the resistivity of the formation near the borehole (shallow resistivity) and at a distance further away from the borehole (deep resistivity); that is, measurements of resistivity of two zones in the formation at different distances from the borehole wall. By comparing the resistivity values, an indication of the presence or absence of mud cake in the formation can be obtained. For example, if the deep resistivity measurement is found to be greater than the shallow resistivity measurement, the presence of a mud cake is indicated, which is an indication that the formation is permeable. If, however, the deep resistivity reading is less than the shallow resistivity reading, the absence of a mud cake is indicated, which is an indication that the formation is impermeable. While low resistivity readings of either the deep or shallow resistivity could prove to be ambiguous, experience has shown that such low resistivity readings are generally obtained opposite impermeable shale zones in the earth formation.

More recently, pad-mounted electrode tools have been developed that provide greater accuracy in obtaining the deep and shallow resistivity measurements. This new spherically-focused logging tool is described in detail in U.S. Pat. No. 3,760,260, which issued on Sept. 18, 1973 to Nick A. Schuster and is assigned to the assignee of the present application. In the system disclosed therein, current electrodes associated with alternating current generators emit a main current, $I_0$, and an auxiliary current, $I_1$, from a central electrode. One of the current generators is controlled in accordance with the potential difference measured on the outer surface of the pad at a selected location in the borehole so that the auxiliary current forces the main current to penetrate into the formation and so that the auxiliary current flows primarily in the mud cake between the pad and the formation or, in the absence of mud cake, in the borehole and earth formation adjacent the borehole. The necessary voltages and currents are monitored by appropriate electronic circuitry to provide the desired values of deep and shallow resistivity.

It has been determined, however, that despite the fact that more accurate resistivity values can be obtained with the spherically-focused, pad-mounted tool identified above, the response of the tool in the presence of mud cake is not always accurate. While in the presence of mud cake, the shallow resistivity is much less than the deep resistivity measurement, and in the absence of mud cake, the shallow resistivity measurement is approximately seven times the deep resistivity measurement, nevertheless, it is difficult to distinguish between the presence of mud cake on the borehole wall and the presence of shale in the formation.

There have been previous attempts to utilize a pad-mounted, spherically-focused electrode tool to obtain information regarding the mud cake on the borehole wall. Two co-pending applications, Ser. Nos. 324,906 and 324,907, both filed Jan. 19, 1973, and now abandoned, in the names of Suau and Attali et al, respectively, each disclose a method and apparatus for obtaining the information concerning the mud cake thickness. However, while these disclosed methods and apparatus do provide accurate results, they do still suffer from the problem of the difficulty in distinguishing between mud cake and shale.

The difficulties in distinguishing between mud cake and shale when using a spherically-focused electrode tool are to a large extent overcome by the techniques disclosed in co-pending U.S. patent application Ser. No. 490,377 of Vieiro filed July 22, 1974 and assigned to the assignee of the present application. According to the technique disclosed by Vieiro, the main and auxiliary currents emitted from the spherically-focused tool are detected and a first parameter produced related solely to the auxiliary current and a second parameter produced related to both the main and auxiliary currents. The technique described in the above-identified Vieiro application, however, did not prove accurate in all types of formations and, in particular, inaccuracies could occur in measurements opposite permeable formations when the ratio of the deep rsistivity to the mud resistivity exceeded 10.

SUMMARY OF THE INVENTION

Accordingly, it is an object of the present invention to provide a method and apparatus for logging an earth formation of interest that overcomes the aforementioned problems in the prior art and, in particular, to provide a spherically-focused, pad-mounted electrode logging tool that can distinguish between permeable and impermeable zones in the earth formation.

It is another object of the present invention to provide a method and apparatus for logging an earth formation that permits a determination of the presence of mud cake in a borehole in all types of formations and under varied borehole and earth formation conditions through the use of a pad-mounted electrode system.

It is a further object of the present invention to provide a pad-mounted electrode tool in which the determination of the presence of permeable and impermeable zones in the earth formation can be made more rapidly and accurately than heretofore possible.

There is provided, in accordance with the present invention, a method and apparatus for investigating a subsurface earth formation traversed by a borehole by distinguishing between permeable and impermeable zones in the earth formation through the use of pad-mounted electrode systems traversing the borehole that determine the presence of mud cake.

In accordance with an illustrative embodiment of the present invention, main and auxiliary currents are emitted into the earth formation surrounding the borehole. The currents are measured and two parameters are produced: a first parameter that is related to the auxiliary current, and a second parameter related to the main current and the first parameter. Furthermore, a ratio of the second parameter to the first parameter is provided. These measurements are used to obtain indications of the permeability of the subsurface earth formation.

BRIEF DESCRIPTION OF THE DRAWING

Further objects and advantages of the present invention will be apparent and a better understanding of the invention will be gained from a consideration of the following description of the preferred embodiments, taken in conjunction with the appended figures of the drawing, in which.

DESCRIPTION OF THE PREFERRED EMBODIMENTS

In the representative embodiments of the invention described hereinafter, a method and apparatus for logging an earth formation of interest is disclosed that provides an indication of the presence of permeable and impermeable zones in the earth formation.

Figure 1:
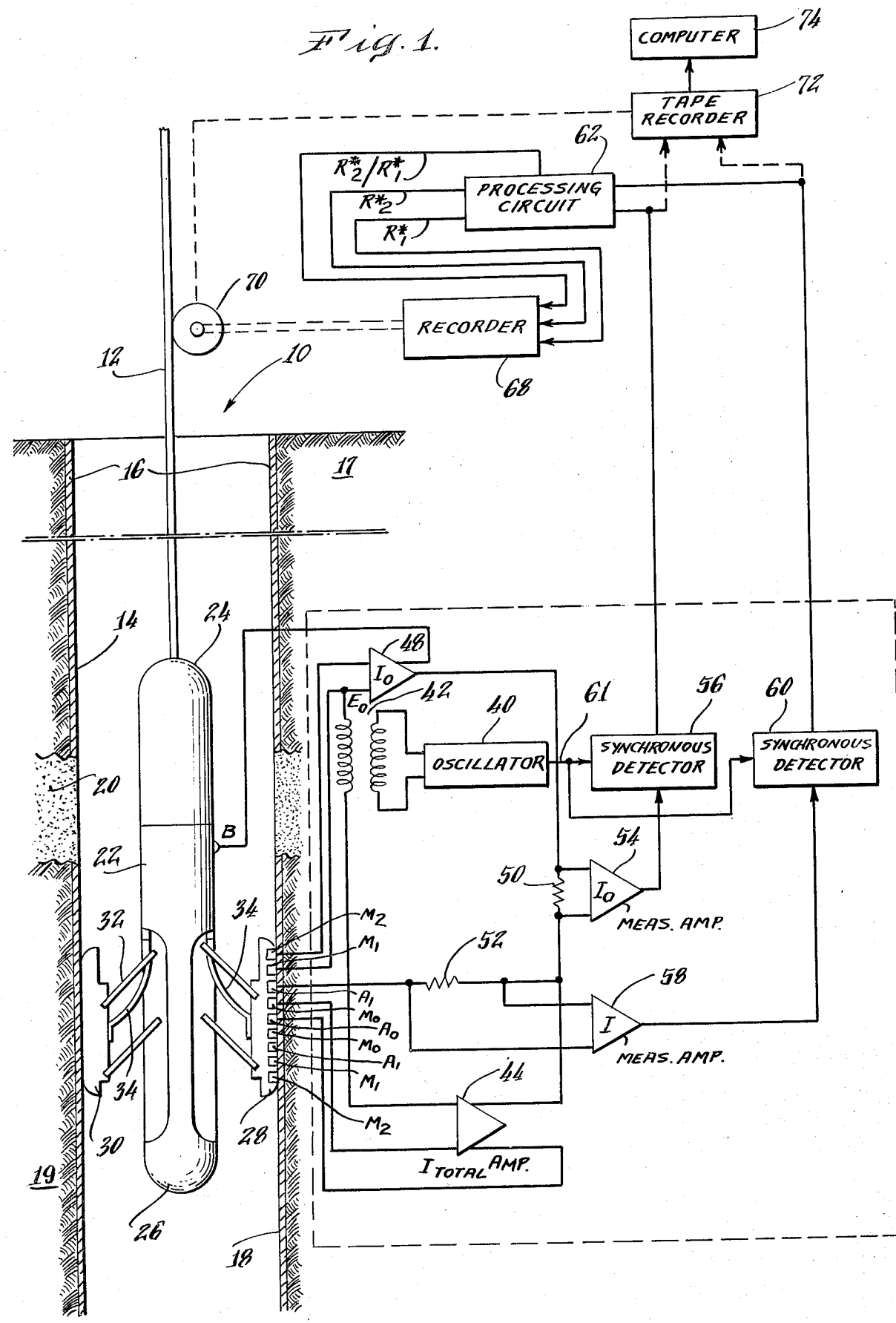
FIG. 1 is a representational view in longitudinal section showing a logging device in accordance with the present invention that is traversing a borehole.

Referring to the drawings, a pad-mounted resistivity measuring device of the spherically-focused type is shown in FIG. 1, which, in accordance with the present invention, is useful in determination of two resistivity measurements that can be used to distinguish between permeable and impermeable formations.

The device 10 is represented as suspended at the end of cable 12 in borehole 14. Mud cake 16, 18 has been formed on the walls of permeable formations 17, 19 during drilling and is not formed on the borehole wall at impermeable formation 20. The device 10 can be moved within the borehole in a conventional manner by reeling or unreeling the cable by means of a winch (not shown) located at the surface. The device comprises a body member 22 whose upper part 24 contains electric circuits, which will be described in greater detail hereinafter, and whose lower part 26 includes a plurality of pads 28 and 30 articulated on the body member by means of arms 32. The pads 28 and 30 are adapted to be applied against the wall of the borehole for example by the action of springs 34. These pads may generally be retracted along the body member by the action of a conventional hydraulic system (not shown) located in the upper part of the member 22. The apparatus shown schematically in FIG. 1 can be constructed according to the technique described in U.S. patent application Ser. No. 62,869, filed on July 7, 1970 by Planche, now Pat. No. 3,678,355.

Pads 28 and 30 are measuring pads equipped with current-emitting or current-return electrodes and potential electrodes. Only the electrodes of pad 28 are shown for simplicity and clarity. The first electrode, $A_0$, is placed substantially at the center of the electrode array with four other electrodes $M_0$, $A_1$, $M_1$, and $M_2$, symmetrically surrounding the central electrode $A_0$ at respective increasing distances from the central electrode. These electrodes can, in particular have a rectangular form such as shown and described in the above-referenced Schuster Patent. The body member 22 comprises a current return electrode B.

These electrodes are connected to electric circuits contained in the upper part 24 of body member 22, which is shown for greater clarity in the right-hand part of FIG. 1 and includes oscillator 40 that provides a constant output voltage, $E_0$, across the primary of transformer 42. One terminal of the secondary of transformer 42 is connected to electrode $M_1$, while the other terminal is connected to one input of a high gain differential amplifier 44. The other input to amplifier 44 is connected to the electrode $M_0$. One output of the amplifier 44 is connected to the electrode $A_0$ and the other output to one terminal of low resistance resistors 50 and 52. The electrodes $M_1$ and $M_2$ are connected to the inputs of a high gain differential amplifier 48 whose outputs are connected, respectively, to the body member electrode B and the other terminal of resistor 50. Electrode $A_1$ is connected to the other terminal of resistor 52. Connected across resistor 50 is an amplifier 54 whose output is applied to a synchronous detector 56, and connected across resistor 52 is an amplifier 58 whose output is applied to synchronous detector 60. The reference signal for detectors 56 and 60 is supplied by oscillator 40 via conductor 61.

In operation, a main current $I_0$ and an auxiliary current $I_1$ are emitted from electrode $A_0$ into the media surrounding the electrode system. The media may include the mud cake on the borehole wall as in borehole sections 16, 18 or only the formation, as in borehole section 20. A first control loop including high gain ammplifier 48 maintains a zero potential difference between electrodes $M_1$ and $M_2$ and a second control loop including amplifier 44 maintains a constant potential difference, $E_0$, between the electrode $M_0$ and the electrode $M_1$. It will be noted that in the circuit shown in FIG. 1, amplifier 44 delivers a total current $(I_1 + I_0)$ while amplifier 48 delivers the current $I_0$. Although the latter is connected between electrodes $A_1$ and B, the potential distribution set up in the borehole causes auxiliary current $I_1$ to flow primarily near the surface of the borehole, particularly in the mud cake is present, and forces the main current $I_0$, to flow in the formation at a greater distance from the borehole wall.

Measure amplifier 54 delivers an AC signal representative of the main current $I_0$ that is rectified in a synchronous detector 56. As the voltage between the electrodes $M_0$ and $M_1$ is kept constant and equal to $E_o$, the DC voltage appearing at the output of detector 56 is proportional to the ratio $E_0I_0$; i.e. is representative of the conductivity of the formation, $\sigma_{i_0}$, traversed by the main current, $I_0$. The inverse of $\sigma_{i_0}$ is the deep resistivity of the formation, $R_d$.

Measure amplifier 58, delivers an AC signal representative of the auxiliary current $I_1$ is applied to synchronous detector 60. The DC voltage appearing at the output of detector 60 is proportional to the ratio $E_0/I_1$; i.e. is representative of the conductivity of the formation, $\sigma_{i_1}$, traversed by the auxiliary current, $I_1$. The output signals of the two measure amplifiers are transmitted to the surface of the earth and applied to processing circuit 62, which produces three output measurements: $R_1^*$, $R_2^*$ and the ratio $R_2^*/R_1^*$ which is representative of the presence of a mud cake and provides an indication of the presence of permeable zones in the earth formation as will be explained in greater detail below. These resistivity measurements are then recorded on recorder 68 as a function of depth, controlled by wheel 70 which rotates as the tool is raised in the borehole to provide a continuous recording versus depth.

Alternatively, the signals from the synchronous detectors can be applied to tape recorder 72, also driven as a function of depth, and then processed in an appropriately programmed general purpose computer 74 to provide the desired resistivity measurements at each depth level. For more detail on the operation of the spherically-focused pad-mounted electrode system such as described herein, reference is made to U.S. Pat. No. 3,760,260 issued to Nick A. Schuster on Sept. 18, 1973, which provides a detailed description of the operation of this type of well logging tool and which is incorporated herein by reference.

Figure 2:
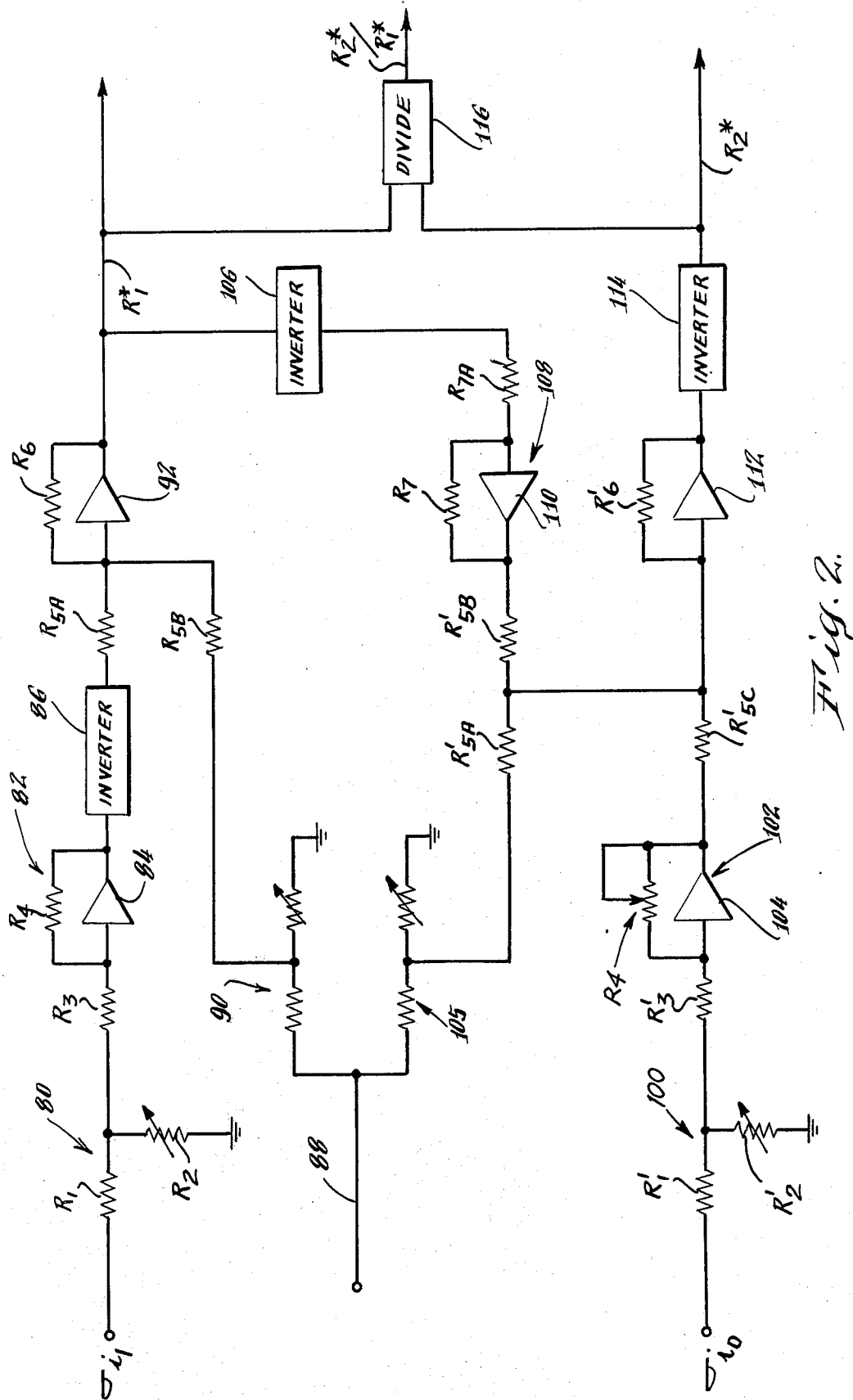
FIG. 2 is a schematic representation showing one form of processing circuit in accordance with one embodiment of the present invention.

Referring to the processing circuit 62, shown in greater detail in FIG. 2, the conductivity $\sigma_{i_1}$, of the borehole and earth formation immediately surrounding the borehole, $\sigma_{i_1}$, is applied to voltage divider 80, includes resistors $R_1$ and $R_2$, that provides a signal $1/8_{R_S}$ for application to operational amplifying network 82. Network 82 includes operation amplifier 84 and resistors $R_3$, $R_4$ and provides a gain of $-10R_m$; where $R_m$ is the resistivity of the mud cake and may be adjusted by an operator at the surface depending on a number of factors, for example, the particular mud used in drilling the borehole being logged. As shown, the gain is adjustable by varying resistor $R_4$. The output $-R_m/0.8R_s$ of network 82 is applied to invertor 86, which inverts the signal to provide the signal $-8R_s/R_M$. An offset equal to $-0.496$ is obtained from a DC reference voltage source (not shown) coupled to line 88 and voltage divider 90. This offset is added, via resistors $R_{5A}$ and $R_{5B}$, to the output of invertor 86 to provide an input to the second operational amplifier network 92 of: $-0.8R_s/R_m$ $-0.496$. Feedback loop R5, R6, provides a gain of minus one, and the output signal from operational amplifier 92 is the first resistivity measurement $R_1^*$:

$$R_1^* = 0.8R_s/R_m + 0.496 \quad (1)$$

The other conductivity measurement, $\sigma_{i_0}$, representative of the conductivity of the earth formation traversed by main current $I_0$, is multiplied by 0.078 in voltage divider 100, which includes resistors $R_1'$ and $R_2'$, to provide an output $0.078/R_d$. That signal is applied to operational amplifying network 102, which includes operational amplifier 104, and resistors $R_3'$, $R_4'$ and provides a gain of $-10 R_m$ that may be adjusted as described above. The output of network 102 is 0.78 $R_m/R_d$, which is then added through resistor $R_{5C}$ to the following signals obtained through resistors $R_{5A}'$ and $R_{5B}'$, respectively:

1. an offset signal obtained by the DC reference voltage through line 88 and voltage divider network 105 equal to $-0.0756$; and
2. a signal obtained by inverting the first resistivity measurement $R_1^*$ in invertor 106 and applying that signal to operational amplifying network 108, including operational amplifier 110 and resistors $R_7$ and $R_{7A}$ to obtain the signal $-0.38/R_1^*$. This signal is multiplied by minus one in operational amplifier 112 and feedback resistor $R_6'$ and applied to invertor 114 to provide the second resistivity measurement $R_2^*$ according to the following equation:

$$R_2^* = \frac{1}{0.78 \frac{R_m}{R_d} + 0.38 \frac{R_m}{R_s} \sigma_2^* + 0.0756} \quad (2)$$

where: $\sigma_2^* = \dfrac{1}{0.8 + 0.496 \dfrac{R_m}{R_s}} = \dfrac{1}{R_1^* \dfrac{R_m}{R_s}}$ The first and second resistivity measurement $R_1^*$, $R_2^*$ are also applied to divider network 116 to produce a ratio signal $R_2^*/R_1^*$.

Figure 3:
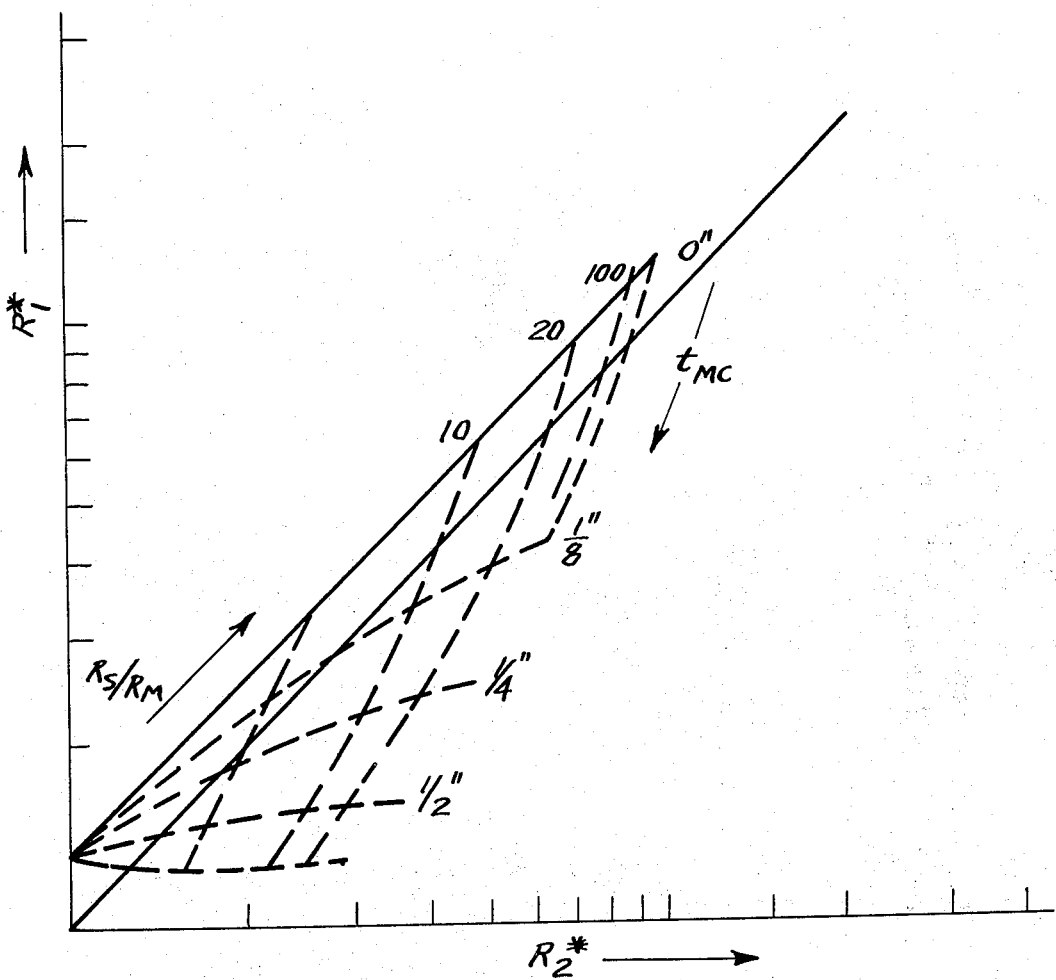
FIG. 3 is a graphical representation showing the relationship between resistivity values determined in accordance with the present invention.

The values of the resistivity parameters $R_1^*$, $R_2^*$ and the ratio $R_2^*/R_1^*$ are useful in that they provide an indication of the nature and extent of permeable formations surrounding the borehole to facilitate the location of hydrocarbon deposits in the earth formation. FIG. 3 is a graphical representation of the relationships between the resistivity parameters determined in accordance with the present invention to aid in the explanation of the usefulness of these parameters. In FIG. 3, $R_1^*$ is plotted along the ordinate and $R_2^*$ is plotted along the abscissa for various values of the ratio of $R_s/R_m$ and mud cake thickness, $t_{mc}$. A line, drawn at a 45° angle, represents equality of the resistivity parameters $R_1^*$ and $R_2^*$. It will be appreciated that when there is no mud cake, i.e., $t_{mc}$ equals zero, $R_1^*$ always exceeds $R_2^*$; and the ratio $R_2^*/R_1^*$ is always less than one. Put another way, when $R_2^*$ exceeds $R_1^*$, or $R_2^*/R_1^*$ exceeds 1, there must be mud cake present on the borehole wall and the formation is permeable. Since hydrocarbons are generally found in permeable formations, it is a relatively simple matter once this ratio is known to identify impermeable depth intervals in the subsurface earth formation by inspection of the synthetic microlog.

The analysis can be further simplified when the ratio $R_2^*/R_1^*$ is recorded by arranging the recorder so that when the ratio equals 1 a zero indication will be recorded on the recording medium, when the ratio exceeds 1 a positive excursion will be recorded on the recording medium and when the ratio is less than 1 a negative excursion will be recorded. Thereby, the microlog will exhibit a positive excursion opposite permeable formations, and impermeable formations, which are unlikely to contain hydrocarbon deposits, can be quickly and accurately recognized.

As described above, zero mud cake thickness and an impermeable formation is generally indicated when $R_1^*$ exceeds $R_2^*$. That may not be true, however, in situations where both $R_1^*$ and $R_2^*$ have low values. Nevertheless, those situations do not present problems in the analysis of the earth formation since at such low values of $R_1^*$ and $R_2^*$, the formation is generally recognized as consisting of shale and a ratio of $R_2^*/R_1^*$ of less than one would still be a relatively accurate indication of the presence of an impermeable formation.

In lieu of the analog circuit of FIG. 2, a programmed general purpose digital computer could be used to compute $R_1^*$, $R_2^*$ and $R_2^*/R_1^*$ and to either print out the values or to provide a continuous recording as desired. This would require that the computer be programmed to provide the solution of equations for $R_1^*$ and $R_2^*$ and form their ratio, which is deemed to be within the skill of a programmer of ordinary skill in the art, and need not be described here in greater detail.

In summary, described herein is a method and apparatus for using a spherically-focused, pad-mounted electrode logging tool to overcome one of the problems in the prior use of such tools: the difficulty in distinguishing between permeable and impermeable formations because of the mud cake which forms on the borehole wall opposite the formations. This difficulty has been overcome by providing two new parameters $R_1^*$ and $R_2^*$, which are derived from borehole measurements in a new and unique manner and which will provide an accurate indication of the existence and extent of permeable subsurface earth formations. The invention provides a simplified, fast and accurate technique for making such a determination and aids in the detection of hydrocarbons below the earth's surface. The specifically disclosed special purpose computer and the programmed general digital computer are not to be construed to be only ways in which these new parameters can be determined and a latitude of modification and substitution can be provided while still being within the spirit and scope of the invention. For example, measurements of the resistivity of the drilling mud can be used in the equations disclosed herein in lieu of the mud cake resistivity.

The above described embodiments are, therefore, intended to be merely exemplary, and all such variations and modifications are intended to be included within the scope of the ivention as defined in the appended claims.

I claim:

1. Apparatus for investigating subsurface earth formations traversed by a borehole, comprising:
   a. means for supporting a plurality of electrodes adapted for movement in a borehole, the plurality of electrodes including at least one current emitting electrode adapted for emitting current into a borehole and the formation surrounding a borehole;
   b. means for emitting a main and an auxiliary current from the at least one current emitting electrode, the main current flowing primarily in the formation surrounding a borehole and the auxiliary current being confined primarily to a borehole and the formation immediately surrounding a borehole; and
   c. means for detecting said main and auxiliary currents to produce first and second resistivity parameters, the first resistivity parameter being related to the auxiliary current and the second resistivity parameter being related to the main current and the first resistivity parameter.

2. The apparatus of claim 1, wherein the first resistivity parameter, $R_1^*$, is determined according to:

$$R_1 = K_1 \, R_s/R_m = K_2$$

wherein:
$R_s$ is representative of the shallow resistivity of the formation;
$R_m$ is representative of the resistivity of the mud cake; and
$K_1$ and $K_2$ are constants.

3. The apparatus of claim 1, wherein said second resistivity parameter, $R_2^*$, is determined according to:

$$R_2^* = \frac{1}{K_1 \dfrac{R_m}{R_d} + K_2 \dfrac{R_m}{R_s} \sigma_2^* + K_3}$$

wherein:
$R_s$ is representative of the shallow resistivity of the formation;
$R_d$ is representative of the deep resistivity of the formation;
$R_m$ is representative of the resistivity of the mud cake; and $K_1$, $K_2$ and $K_3$ are constants.

$$\sigma_2^* = \frac{1}{R_1^* \dfrac{R_m}{R_s}}$$

4. The apparatus of claim 1 further including means for producing a third resistivity parameter related to the first and second resistivity parameters, the third resistivity parameter providing an indication of permeable and impermeable zones in the subsurface earth formation.

5. Apparatus for investigating subsurface earth formations traversed by a borehole to determine the presence of permeable zones in the formation comprising:
   a. means for supporting a plurality of pad-mounted electrodes adapted for movement in a borehole, the plurality of electrodes including at least one current emitting electrode adapted for emitting current into a borehole;
   b. means for emitting a main and auxiliary current from said current emitting electrode, said main current flowing primarily in the formations surrounding a borehole and the auxiliary current being confined primarily to a borehole and the formations immediately surrounding a borehole; and
   c. means for detecting the main and auxiliary currents to produce first and second resistivity parameters, the first resistivity parameter being related to the auxiliary current and the second resistivity parameter being related to the main current and the first resistivity parameter; and
   d. means for combining said first and second resistivity parameters to produce a third resistivity parameter indicative of the presence of permeable zones in the formation.

6. An apparatus for investigating subsurface earth formations traversed by a borehole, comprising:
   a. means for supporting a plurality of electrodes adapted for movement in a borehole, the plurality of electrodes including at least one current emitting electrode adapted for emitting current into the borehole and a plurality of potential monitoring electrodes;

b. means for supplying both survey and auxiliary currents to the at least one current emitting electrode for emission into the media surrounding the supporting means, the survey current returning to a first return electrode for return to the current supplying means and the auxiliary current returning to at least one return electrode located relatively near the current emitting electrode for return to the current supplying means;

c. means for measuring the potential at a plurality of points along the supporting means;

d. means operative in response to the measured potentials for adjusting one of the survey or auxiliary currents to establish a given potential distribution in at least a portion of the borehole so that the auxiliary current will tend to force the survey current into the formation; and e. means for producing first and second resistivity parameters related to the main and auxiliary currents, the first rsistivity parameter being related to the auxiliary current and the second resistivity parameter being related to the main current and the first resistivity parameter; and f. means for relating said first and second resistivity parameters to produce an indication of the presence of permeable zones in the formation.

7. A method of investigating subsurface earth formations traversed by a borehole comprising the steps of:

a. supporting a plurality of electrodes adapted for movement in a borehole, the plurality of electrodes including at least one current emitting electrode adapted for emitting current into a borehole and the formation surrounding a borehole;

b. emitting a main and an auxiliary current from the at least one current emitting electrode, the main current flowing primarily in the formation surrounding a borehole and the auxiliary current being confined primarily to a borehole and the formation immediately surrounding a borehole; and c. detecting said main and auxiliary currents to produce first and second resistivity parameters, the first resistivity parameter being related to the auxiliary current and the second resistivity parameter being related to the main current and the first resistivity parameter.

8. The method of claim 7, wherein the first resistivity parameter, $R_1^*$, is determined according to:

$$R_1^* = K_1 \frac{R_s}{R_m} + K_2$$

wherein:
$R_s$ is representative of the shallow resistivity of the formation;
$R_m$ is representative of the resistivity of the mud cake; and
$K_1$ and $K_2$ are constants.

9. The method of claim 7, wherein said second resistivity parameter, $R_2^*$, is determined according to:

$$R_2^* = \frac{1}{K_1 \frac{R_m}{R_d} + K_2 \frac{R_m}{R_s} \sigma_2^* + K_3}$$

wherein:
$R_s$ is representative of the shallow resistivity of the formation;
$R_d$ is representative of the deep resistivity of the formation;
$R_m$ is representative of the resistivity of the mud cake; and
$K_1$, $K_2$ and $K_3$ are constants.

$$\sigma_2^* = \frac{1}{R_1^* \frac{R_m}{R_s}}$$

10. The method of claim 7 further including the step of producing a third resistivity parameter related to the first and second resistivity parameters, the third resistivity parameter providing an indication of permeable and impermeable zones in the subsurface earth formation.

11. A method of investigating subsurface earth formations traversed by a borehole to determine the presence of permeable zones in the formation comprising the steps of:

a. supporting a plurality of pad-mounted electrodes adapted for movement in a borehole, the plurality of electrodes including at least one current emitting electrode adapted for emitting current into a borehole;

b. emitting a main and auxiliary current from said current emitting electrode, said main current flowing primarily in the formations surrounding a borehole and the auxiliary current being confined primarily to a borehole and the formations immediately surrounding a borehole;

c. detecting the main and auxiliary currents to produce first and second resistivity parameters, the first resistivity parameter being related to the auxiliary current and the second resistivity parameter being related to the main current and the first resistivity parameter; and d. means for combining said first and second resistivity parameters to produce a third resistivity parameter indicative of the presence of permeable zones in the formation.

12. A method of investigating subsurface earth formations traversed by a borehole comprising the steps of:

a. supporting a plurality of electrodes adapted for movement in a borehole, the plurality of electrodes including at least one current emitting electrode adapted for emitting current into the borehole and a plurality of potential monitoring electrodes;

b. supplying both survey and auxiliary currents to the at least one current emitting electrode for emission into the media surrounding the supporting means, the survey current returning to a first return electrode for return to the current supplying means and the auxiliary current returning to at least one return electrode located relatively near the current emitting electrode for return to the current supplying means;

c. measuring the potential at a plurality of points along the supporting means;
d. adjusting one of the survey or auxiliary currents in response to the measured potentials to establish a given potential distribution in at least a portion of the borehole so that the auxiliary current will tend to force the survey current into the formation;
e. producing first and second resistivity parameters related to the main and auxiliary currents the first resistivity parameter being related to the auxiliary current and the second resistivity parameter being related to the main current and the first resistivity parameter; and
f. relating said first and second resistivity parameters to produce an indication of the presence of permeable zones in the formation.

13. Apparatus for investigating subsurface earth formations traversed by a borehole, the borehole having mud cake formed in the walls thereof having a mud cake resistivity, comprising:
   a. means for supporting a plurality of electrodes adapted for movement in a borehole, the plurality of electrodes including at least one current emitting electrode adapted for emitting current into a borehole and the formation surrounding a borehole;
   b. means for emitting a main and an auxiliary current from the at least one current emitting electrode, the main current flowing primarily in the formation surrounding a borehole and the auxiliary current being confined primarily to a borehole and the formation immediately surrounding a borehole;
   c. means for detecting said main and auxiliary currents to produce resistivity parameters indicative of the shallow resistivity $R_s$ of the formation and the deep resistivity $R_d$ of the formation; and
   d. means for combining the resistivity measurements to produce a first resistivity parameter functionally related to the ratio of shallow resistivity of the formation to mud cake resistivity and a second resistivity parameter functionally related to the ratio of the mud cake resistivity to deep resistivity of the formation and to the first resistivity parameter.

14. The apparatus of claim 13 further including means for forming the ratio of the first and second resistivity parameters to produce a third resistivity parameter indicative of permeable zones of the formation.

15. A method of investigating subsurface earth formations traversed by a borehole, the borehole having mud cake formed thereon having a mud cake resistivity, comprising the steps of:
   a. supporting a plurality of electrodes adapted for movement in a borehole, the plurality of electrodes including at least one current emitting electrode adapted for emitting current into a borehole and the formation surrounding a borehole;
   b. emitting a main and an auxiliary current from the at least one current emitting electrode, the main current flowing primarily in the formation surrounding a borehole and the auxiliary current being confined primarily to a borehole and the formation immediately surrounding a borehole;
   c. detecting said main and auxiliary currents to produce resistivity parameters indicative of the shallow resistivity $R_s$ of the formation and the deep resistivity $R_d$ of the formation; and
   d. combining the resistivity measurements to produce a first resistivity parameter functionally related to the ratio of shallow resistivity of the formation to mud cake resistivity and a second resistivity parameter functionally related to the ratio of the mud cake resistivity to deep resistivity of the formation and to the first resistivity parameter.

16. The method of claim 15 further including forming the ratio of the first and second resistivity parameters to produce a third resistivity parameter indicative of permeable zones of the formation.

* * * * *